Dec. 25, 1923.
J. SIMPSON
1,478,585
ENEMY BEARING AND RANGE INDICATOR
Filed Oct. 27, 1919     2 Sheets-Sheet 1
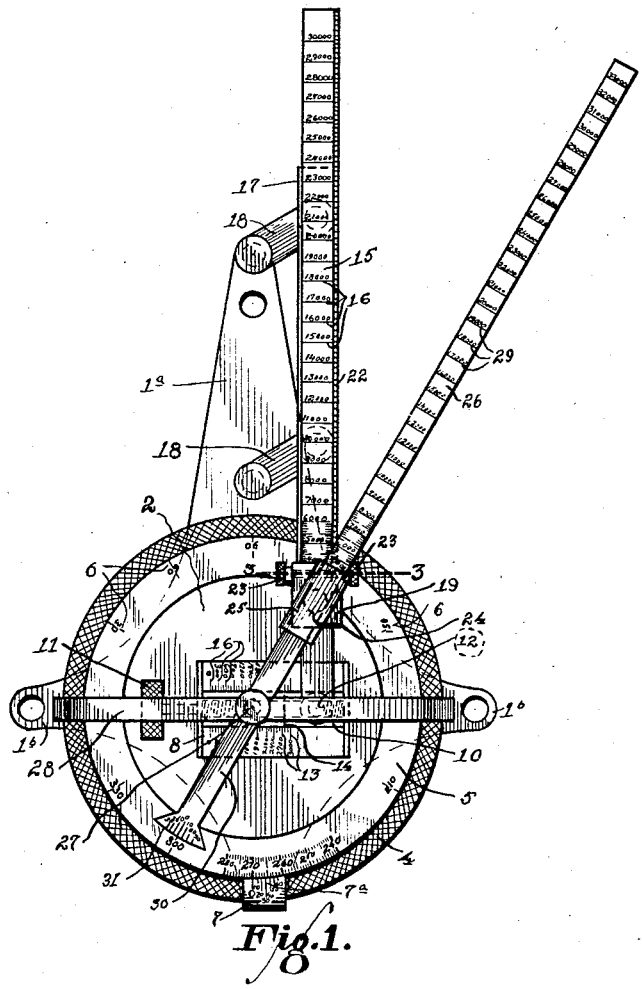
Fig.1.
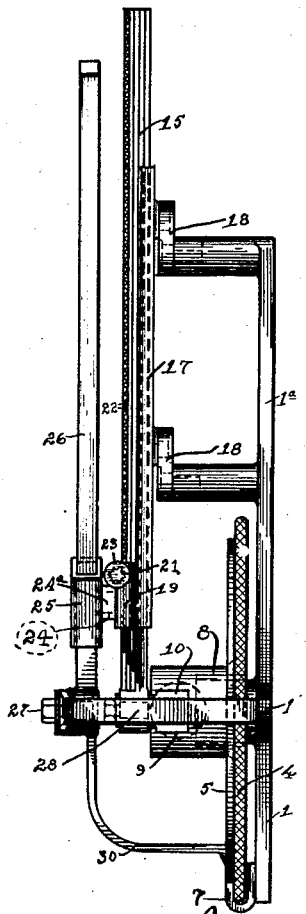
Fig.2.
Fig.3.
INVENTOR,
Jacob Simpson.
BY H.S. Hill
ATTORNEY.

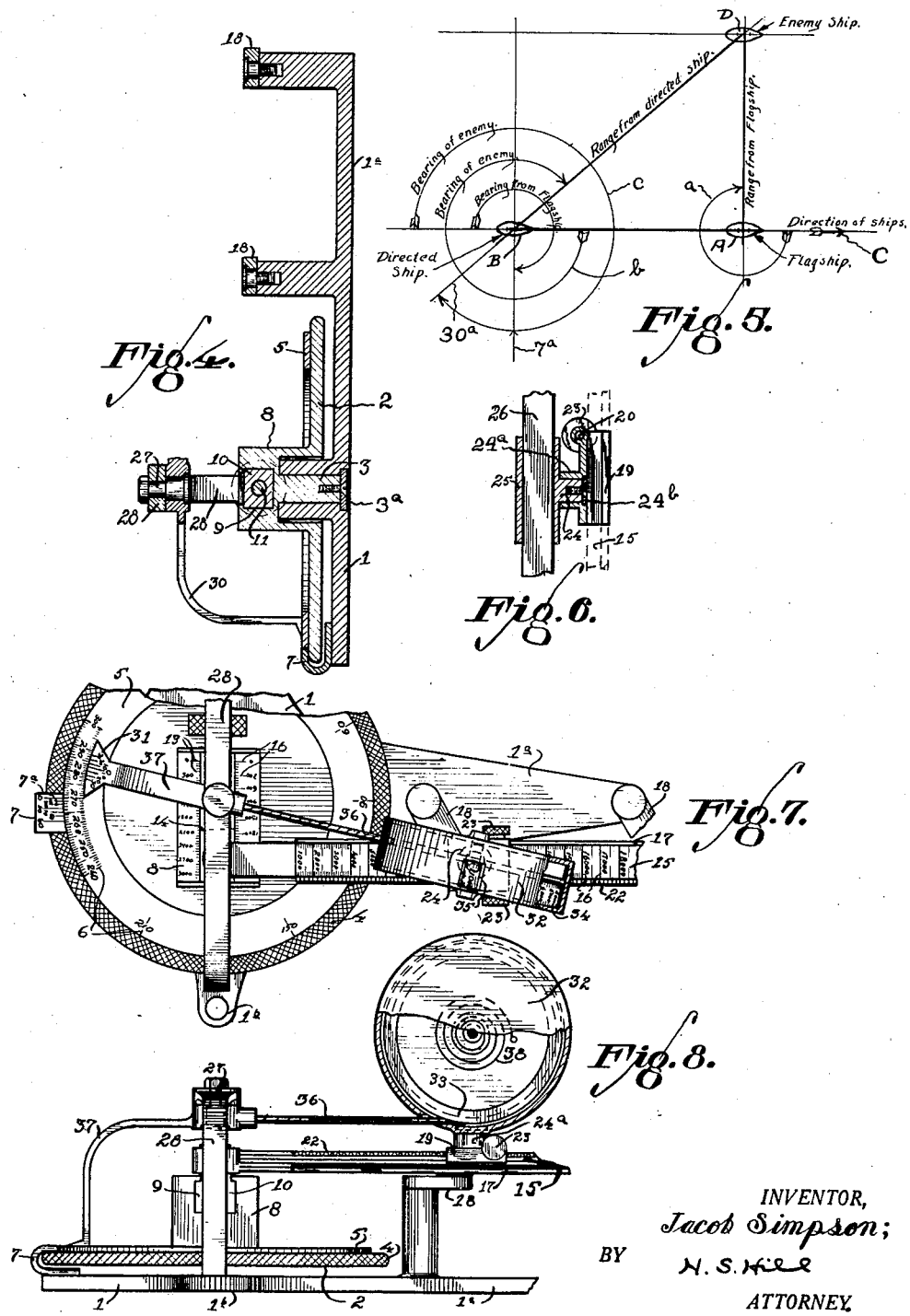

Patented Dec. 25, 1923.

1,478,585

UNITED STATES PATENT OFFICE.

JACOB SIMPSON, OF NEW YORK, N. Y.

ENEMY BEARING AND RANGE INDICATOR.

Application filed October 27, 1919. Serial No. 333,719.

*To all whom it may concern:*

Be it known that I, JACOB SIMPSON, a citizen of the United States, residing at New York, in the county of New York, State of New York, have invented a new and useful Enemy Bearing and Range Indicator; and I do hereby declare the following to be a full, clear, and exact description of the invention, such as will enable others skilled in the art to which it appertains to make and use the same.

The present invention is an instrument for use upon a battleship for quickly and automatically determining the bearing and range of a target when the bearing and range of the target from the flagship, as well as the distance of the battleship from the flagship is known.

In a column or squadron of battleships it is sometimes desirable to concentrate the fire of one or more ships upon one particular enemy ship when engaged in battle with an enemy squadron. The enemy ship selected for attack is designated or located by its bearing and range or distance, the bearing being the horizontal angle measured in a clockwise direction from the head of the ship to a line extending from the ship to the target. The commander of the squadron, who is usually located on the flagship, ascertains by means of suitable instruments the range and bearing of the enemy ship from the flagship, and then transmits this information to the other ship of the squadron which is directed to fire upon the designated enemy ship. The directed ship, knowing its distance from the flagship, and also the bearing and range of the enemy ship from the flagship, must compute or otherwise ascertain the bearing and range of the enemy ship with reference to its own position. It is the object of the present invention to provide an instrument by means of which the desired range and bearing of the enemy ship can be quickly and accurately ascertained without the necessity of making any actual mathematical calculations. Time is thus saved and the possibility of error practically eliminated. The instrument has the further advantage of giving the bearing angle directly, and not merely a correction angle which must be added to or substracted from the bearing angle signaled from the flagship. This instrument can also be used to ascertain the target bearing angle of one turret relative to another turret on the same ship.

Further objects of the invention are to provide an instrument of this character which is comparatively simple and inexpensive in its construction, which has a compact arrangement of parts, which can be easily and quickly manipulated, and which will give accurate results.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a front elevation of an instrument constructed in accordance with the invention.

Figure 2 is a side elevation thereof.

Figure 3 is an enlarged transverse sectional view on the line 3—3 of Figure 1.

Figure 4 is a longitudinal sectional view through the instrument.

Figure 5 is a digrammatic view explaining the purpose and manner of using the instrument.

Figure 6 is an enlarged sectional view through the runner and the guide sleeve which is pivotally mounted thereon.

Figure 7 is a front elevation of a modified construction, portions being broken away.

Figure 8 is a side elevation thereof with portions broken away.

Corresponding and like parts are referred to in the following description and indicated in all the views of the drawings by the same reference characters.

Referring to Figures 1 and 2 of the drawings, which illustrate one possible embodiment of the invention, the numeral 1 designates a base plate which is formed with an elongated extension 1ª, and also with laterally projecting perforated ears 1ᵇ by means of which it can be secured to a suitable support if desired. A dial 2 is pivotally connected to the base plate at substantially the central portion thereof by means of a pivot pin 3 and screw 3ª. The marginal or peripheral portion of the dial is roughened or knurled, as indicated at 4, so that the dial can be readily rotated and set in the desired position by hand. A graduated plate or ring 5 is supplied to the face of the dial 2, and the periphery of the plate is provided with an annular set of graduations 6 which extend entirely around the same and range from 0° to 360°. These graduations cooperate with a stationary pointer 7 which may be rigidly applied to the base plate 1, and is shown as bent around the edge of the dial 2. This pointer 7 is shown as provided with ten minute vernier graduations 7ª, and the dial can thus be set in the desired position with great accuracy.

The center of the dial member 2 is provided with a hub or enlarged portion 8 which has an undercut slot 9 therein, said slot extending in a direction across the dial from the zero graduation to the 180° graduation. A slide 10 is mounted within this slot, and a screw 11 is provided for moving the slide back and forth to adjust the position thereof. A pivot stud 12 projects from the slide, and graduations 13 at the sides of the slot 9 cooperate with a pointer or line 14 on the slide to indicate the distance between the axis of the pivot stud 12 and the axis of the dial. These graduations 13 are shown as ranging from 0 to 3000.

A long bar 15 is centered on the pivot stud 12 of the slide, said bar being substantially H shaped in cross section, as indicated by Fig. 3, and being provided with graduations 16 which are on the same scale as the graduations 13 and range from zero at the axis of the stud 12 to 30,000 at the free end of the bar. This bar 15 is slidably engaged at the back thereof by a channel shaped guide member 17 which serves to support the bar in proper position. This guide is pivotally connected to the extension 1ª of the base by means of the two links 18 which enable the guide to be moved toward and away from the axis of the extension 1ª, although it is always maintained in a position parallel to the said axis. A slide or runner 19 is mounted upon the front of the bar 15 for cooperation with the graduations 16 thereon. Journaled upon this slide or runner 19 is a transverse shaft 20, said shaft being provided with a pinion 21 which meshes with a rack 22 on the bar. Finger pieces 23 at the ends of the shaft enable the shaft to be readily turned for the purpose of setting the slide or runner 19 on the bar 15.

A bearing 24ª projects from the slide 19 and receives a pivot stud 24 on a guide sleeve 25, said pivot stud having a retaining screw 24ᵇ fitted in the extremity thereof. Slidable through this guide sleeve 25 is a graduated bar 26 which is pivoted on a stud 27 carried by a suitable strap or bracket 28 extending transversely across the dial 2, the axis of the said pivot stud being in alinement with the axis about which the dial rotates. The graduations 29 on this bar 26 are on the same scale as the graduations 13 and 16 and range from zero at the pivot center to 32,000 at the free end of the bar. An extension 30 at the pivot end of the bar 26 projects over the dial 2 and terminates in a pointer which is arranged for cooperation with the graduations of the dial plate to enable a reading to be obtained. This pointer is shown as provided with a vernier 31 so that the angle to be measured can be read with accuracy.

In Fig. 5, the different bearings and distances which are known or to be determined are indicated diagrammatically. The flagship A and directed ship B are in column formation and headed in the direction indicated by the arrow C. The enemy ship or target is indicated at D. The distance between the ships A and B is known, as well as the bearing angle $a$ of the target ship D from the flagship A. The desired bearing angle $b$ of the target ship D from the directed ship B is the same as the angle $c$, which is given by the instrument in a manner to be presently described. The fixed pointer 7 of the instrument is indicated diagrammatically at 7ª, and the swinging pointer 30 at 30ª. This diagrammatic view, when taken in connection with the following explanation will make the operation of the instrument clear.

In the operation of the instrument the bearing angle of the target from the flagship is set at the stationary pointer 7 by suitably rotating the dial 2. The distance in yards between the flagship or directing ship and the firing or directed ship is set upon the graduations 13 by manipulating the screw 11 and moving the slide 10 in the required manner. The third and final step in setting the instrument is to move the slide or runner 19 on the bar 15 until the distance in yards between the flagship and the target ship is set off on the scale 16. The upper end of the runner is used in connection with the graduations, and the runner can be readily adjusted in the required manner by manipulating the finger pieces 23. The distance in yards from the directed ship to the target ship can now be read directly from the scale 29 on the bar 26, considering the upper end of the sleeve as cooperating with the graduations, and the bearing of the enemy ship from the directed ship read directly at the end of the movable pointer 30. The desired information, namely, the range and bearing of the target from the directed ship are thus obtained quickly, directly, and with accuracy.

A slight modification is illustrated by Figs. 7 and 8. In these figures a circular casing 32 is substituted for the guide sleeve 25 of the previous construction and swiveled on the bearing member 24ª of the slide 19. A drum 33 is journaled in this casing, and the periphery of the drum is provided with graduations 34 which correspond to the graduations 29 on the bar 26 of the construction previously described, said graduations 34 being readable through a sight opening 35 in the casing 32. A cable 36 is wound upon the drum 33 and the free end thereof carried to a pointer which corresponds with the pointer or extension 30 of the previous construction. A spring 38 is arranged within the casing 32 and normally tends to rotate the drum 33 to wind the cable 36 thereon and hold the cable taut, thereby causing the graduations on the drum to read properly, and also causing the pointer 37 to swing over the dial 2 in the proper manner. The operation of this modified form of the invention is almost identical with that previously described. The instrument is set in exactly the same manner and there is no difference whatever in the adjustments. The desired bearing angle is read at the end of the pointer 37 on the graduated dial plate 5, and the range of the target ship from the directed ship is read through the sight opening 35 of the drum 33. This modified construction has the advantage of requiring less space for its operation, since the graduated bar 26 with its projecting free end is eliminated.

While I have described certain preferred forms and embodiments of the invention, it will be understood that many modifications and changes can be made without departing from the spirit of the invention, and that I do not limit myself to the exact construction shown in the application.

The instrument can also be used for other analogous purposes, such as for directing the firing of a battery of land artillery upon a visible or invisible enemy point.

Having thus described the invention, what I claim as new and desire to secure by Letters Patent, is:—

1. A device of the character described, including a base, a rotatable dial thereon, means for setting the dial in any determined position, a scale movable in a direction always parallel to itself and having a radially adjustable attachment with the dial, a second scale pivoted to turn upon an axis concentric with the dial and having an adjustable connection with the first mentioned scale, and an extension carried by the first mentioned scale and playing over the dial.

2. A device of the character described, including a base, a rotatable dial thereon, a fixed pointer cooperating with the dial to set the latter, a movable pointer mounted to play over the dial, a slide adjustable transversely upon the dial, a graduated bar carried by the slide, a runner adjustable upon the bar, and means cooperating with the runner to position the movable pointer according to the adjustment of the runner.

3. A device of the character described, including a base, a rotatable dial thereon, a fixed pointer cooperating with the dial to set the same, a movable pointer mounted to play over the dial, a slide adjustable transversely upon the dial, a graduated bar carried by the slide, a runner adjustable upon the bar, and means actuated by the runner to scale the distance between the runner and the movable pointer and at the same time position the movable pointer on the dial according to the adjustment of the runner.

4. A device of the character described, including a base, a rotatable dial thereon, a fixed pointer cooperating with the dial to set the same, a swinging pointer having the same axis as the dial and mounted to play over the same, a slide adjustable transversely upon the dial, a graduated bar carried by the slide, the adjustment of the slide enabling the connecting point with the graduated bar and the axis of the dial to be set a predetermined distance apart, a runner adjustable on the graduated bar, and an operative connection between the runner and the swinging pointer for positioning the latter according to the adjustment of the slide and runner.

5. A device of the character described, including a base, a rotatable dial thereon, a fixed pointer cooperating with the dial to set the same, a swinging pointer having the same axis as the dial and mounted to play over the same, a slide adjustable transversely upon the dial, a graduated bar carried by and pivotally connected to the slide, the adjustment of the slide enabling the said pivotal connection and the axis of the dial to be set a predetermined distance apart, means for holding the graduated bar in a proper relative relation to the other parts, a runner adjustable on the bar, and an operative connection between the runner and the swinging pointer for positioning the latter according to the adjustment of the slide and runner.

6. A device of the character described, including a base, a rotatable dial thereon, a fixed pointer cooperating with the dial to set the same, a swinging pointer having the same axis as the dial and mounted to play over the same, a slide adjustable transversely upon the dial, a graduated bar carried by and pivotally connected to the slide, the adjustment of the slide enabling the said pivotal connection and the axis of the dial to be set a predetermined distance apart, means for supporting the graduated bar so that it is movable transversely and always occupies a position parallel to its previous position, a runner adjustable on the bar, and an operative connection between the runner and the swinging pointer for positioning the latter according to the adjustment of the slide and runner.

7. A device of the character described, including a base, a rotatable dial thereon, a fixed pointer cooperating with the dial to set the same, a swinging pointer having the same axis as the dial and mounted to play over the same, a slide adjustable transversely upon the dial, a graduated bar carried by and pivotally connected to the slide, the adjustment of the slide enabling the same pivotal connection and the axis of the dial to be set a predetermined distance apart, a guide slidably receiving the graduated bar, a plurality of links pivotally supporting the guide so that it is movable laterally but always extends in the same direction, a runner adjustable on the graduated bar, and an operative connection between the runner and the swinging pointer for positioning the latter according to the adjustment of the slide and runner.

8. A device of the character described, including a base, a rotatable dial thereon, a fixed pointer cooperating with the dial to set the same, a swinging pointer having the same axis as the dial and mounted to play over the same, a slide adjustable transversely upon the dial, a graduated bar carried by and pivotally connected to the slide, the adjustment of the slide enabling the said pivotal connection and the axis of the dial to be set a predetermined distance apart, means for supporting the graduated bar so that it is movable transversely and always occupies a position parallel to its previous position, a runner adjustable on the graduated bar, a guide member carried by the runner, and a second graduated bar engaged by the guide member and rigid with the swinging pointer for positioning the latter according to the adjustment of the slide and runner.

9. A device of the character described, including a base, a rotatable dial thereon, a fixed pointer cooperating with the dial for setting the same, a swinging pointer having the same axis as the dial and mounted to play over the same, a slide adjustable transversely upon the dial, a graduated bar carried by and pivotally connected to the slide, the adjustment of the slide enabling the said pivotal connection and the axis of the dial to be set a predetermined distance apart, means for supporting the graduated bar so that it is movable transversely and always occupies a position parallel to its previous position, a runner adjustable on the graduated bar, a guide sleeve swiveled on the runner, and a second graduated bar slidable through the guide sleeve and rigid with the swinging pointer for positioning the latter upon the dial according to the adjustment of the slide and runner.

10. A device of the character described, including a base, a rotatable dial thereon, a fixed pointer cooperating with the dial for setting the same, a swinging pointer having the same axis as the dial and mounted to play over the same, a slide adjustable transversely upon the dial, a graduated bar carried by and pivotally connected to the slide, the adjustment of the slide enabling the said pivotal connection and the axis of the dial to be set various distances apart, means for holding the graduated bar in a proper relative position to the other parts, a runner slidable on the graduated bar, a rack and pinion device for adjusting the runner, and an operative connection between the runner and the swinging pointer for positioning the latter on the dial according to the adjustment of the slide and runner.

11. A device of the character described, including a base, a rotatable dial thereon, a fixed pointer cooperating with the dial for setting the same, a swinging pointer having the same axis as the dial and mounted to play over the same, a slide adjustable transversely upon the dial, a graduated bar pivotally connected to the slide, the adjustment of the slide enabling the said pivotal connection and the axis of the dial to be set different distances apart, means for supporting the graduated bar so that it is movable transversely and always occupies a position parallel to its previous position, a runner adjustable on the graduated bar, a spring actuated drum carried by the runner, and a cable wound upon the drum and operatively connected with the swinging pointer for positioning the latter on the dial according to the adjustment of the slide and runner.

12. A device for determining directly the bearing and range of a target from a directed point when the bearing and range of said target from a directing point are known, the distance between said points being variable but also known, including a single dial, a scale movable in a direction parallel to itself and having a pivotal connection with the dial which is radially adjustable thereon, a second scale pivotally mounted upon the axis concentric with that of the dial, an adjustable connection between the opposite ends of the scale, and a pointer carried by the second mentioned scale and arranged to play over the dial.

In testimony whereof I have signed my name to this specification.

JACOB SIMPSON.